United States Patent
Yamaguchi et al.

(10) Patent No.: US 8,632,125 B2
(45) Date of Patent: Jan. 21, 2014

(54) HEADREST DEVICE, METHOD OF ADJUSTING HEADREST POSITION, AND VEHICLE SEAT

(75) Inventors: Hiroyoshi Yamaguchi, Yokohama (JP); Kenzou Yasuda, Yokohama (JP); Makoto Hasegawa, Yokohama (JP); Takeshi Ito, Yokohama (JP); Eiji Shimizu, Yokohama (JP); Satoshi Nishikido, Yokohama (JP)

(73) Assignee: NHK Spring Co., Ltd., Yokohama-shi (JP)

( * ) Notice: Subject to any disclaimer, the term of this patent is extended or adjusted under 35 U.S.C. 154(b) by 169 days.

(21) Appl. No.: 13/197,666

(22) Filed: Aug. 3, 2011

(65) Prior Publication Data
US 2012/0032487 A1    Feb. 9, 2012

(30) Foreign Application Priority Data
Aug. 5, 2010    (JP) .................................. 2010-176646

(51) Int. Cl.
*B60N 2/427*    (2006.01)
*B60N 2/42*    (2006.01)
*B60R 21/055*    (2006.01)

(52) U.S. Cl.
USPC .................................................. 297/216.12

(58) Field of Classification Search
USPC .................................................. 297/216.12
See application file for complete search history.

(56) References Cited

U.S. PATENT DOCUMENTS

| 5,466,001 | A  | * | 11/1995 | Gotomyo et al. | ..... 297/216.12 X |
| 7,618,091 | B2 | * | 11/2009 | Akaike et al. | ............ 297/216.12 |
| 7,992,933 | B2 | * | 8/2011 | Yetukuri et al. | ......... 297/216.12 |
| 8,141,945 | B2 | * | 3/2012 | Akaike et al. | ............ 297/216.12 |
| 8,408,644 | B2 | * | 4/2013 | Frose et al. | ............. 297/216.12 |
| 8,408,645 | B2 | * | 4/2013 | Alexander et al. | ....... 297/216.12 |
| 8,434,818 | B2 | * | 5/2013 | Humer et al. | ............ 297/216.12 |
| 8,491,052 | B2 | * | 7/2013 | Werner | .................... 297/216.12 |
| 2007/0257528 | A1 | * | 11/2007 | Akaike et al. | ............ 297/216.12 |

(Continued)

FOREIGN PATENT DOCUMENTS

| JP | 11-334437 | 12/1999 |
| JP | 2006-182276 | 7/2006 |
| JP | 2009-154551 | 7/2009 |

OTHER PUBLICATIONS

Office Action mailed Jul. 3, 2012 in corresponding Japanese Application No. 2010-176646.

*Primary Examiner* — Rodney B White
(74) *Attorney, Agent, or Firm* — Knobbe Martens Olson & Bear LLP

(57) ABSTRACT

There is provided a headrest device including: a headrest main body that is provided at an upper end portion of a seat back of a seat in which a passenger sits; a pressure/flexure detecting section that is provided at a vehicle front side of the seat back; a headrest moving section; and a control section that estimates a current back-set, that is a distance between a head portion of a passenger and the headrest main body in a horizontal direction, on the basis of at least one of pressure and flexure detected by the pressure/flexure detecting section and a predetermined relationship between back-set and the at least one of pressure and flexure, and controls the headrest moving section to move the headrest main body such that the back-set becomes a predetermined amount.

11 Claims, 19 Drawing Sheets

(56) References Cited

U.S. PATENT DOCUMENTS

| | | | |
|---|---|---|---|
| 2008/0012402 A1* | 1/2008 | Sekida | 297/216.12 |
| 2009/0062989 A1* | 3/2009 | Sakai et al. | 297/216.12 X |
| 2009/0243355 A1* | 10/2009 | Heeg et al. | 297/216.12 |
| 2010/0001562 A1* | 1/2010 | Sayama | 297/216.12 |
| 2010/0090505 A1* | 4/2010 | Tarusawa et al. | 297/216.12 |
| 2010/0264704 A1* | 10/2010 | Yasuda et al. | 297/216.12 |
| 2010/0314918 A1* | 12/2010 | Alexander et al. | 297/216.12 |

* cited by examiner

HEADREST DEVICE, METHOD OF ADJUSTING HEADREST POSITION, AND VEHICLE SEAT

CROSS-REFERENCE TO RELATED APPLICATION

This application is based on and claims priority under 35 USC 119 from Japanese Patent Application No. 2010-176646 filed on Aug. 5, 2010, the disclosure of which is incorporated by reference herein.

BACKGROUND

1. Technical Field

The present invention relates to a headrest device, a headrest position adjusting method and a vehicle seat, and in particular, relates to a headrest device, a headrest position adjusting method and a vehicle seat that can automatically adjust the position of a headrest to an appropriate state.

2. Related Art

There have conventionally been proposed a headrest position adjusting device and headrest position adjusting method in which the electrostatic capacity between a headrest and the head portion of a person seated in a seat is measured by sensing electrodes that are disposed at the front surface side of the headrest over the entire region in the height direction thereof, and the position of the headrest is adjusted on the basis of the results of measurement (see, for example, Japanese Patent Application Laid-Open (JP-A) No. 2009-154551).

However, in the technique disclosed in JP-A No. 2009-154551, the electrostatic capacity between the head portion and the headrest is used in order to adjust the position of the headrest, and therefore, there is the problem that the cost is high. Further, while the electrostatic capacity is being measured, if there is a momentary movement of the head portion due to the driver confirming the region at the rear of the vehicle in the rear-view mirror or operating the car navigation device, or if there is continuous movement of the head portion due to vibration or the like, there are the problems that the measurement of the electrostatic capacity is unreliable and measurement requires a long time.

SUMMARY

The present invention was made in order to overcome the above-described problems, and an object thereof is to provide a headrest device, a headrest position adjusting method and a vehicle seat that can adjust the position of a headrest to an appropriate state, stably and in a short time and by an inexpensive structure.

In order to achieve the above-described object, a first aspect of the present invention provides a headrest device including:

a headrest main body that is provided so as to be movable in a vehicle longitudinal direction, at an upper end portion of a seat back of a seat in which a passenger sits;

a pressure/flexure detecting section that is provided at a vehicle front side of the seat back, and that detects at least one of pressure that is applied to the seat back from a back portion of a passenger seated in the seat, and flexure of the seat back;

a headrest moving section that moves the headrest main body in the vehicle longitudinal direction; and a control section that estimates a current back-set, that is a distance between a head portion of a passenger and the headrest main body in a horizontal direction, on the basis of at least one of pressure and flexure detected by the pressure/flexure detecting section and a predetermined relationship between back-set and the at least one of pressure and flexure, and controls the headrest moving section to move the headrest main body such that the back-set becomes a predetermined amount.

In accordance with the headrest device of the present invention, the headrest main body is provided so as to be movable in a vehicle longitudinal direction, at an upper end portion of a seat back of a seat in which a passenger sits. The headrest main body is moved in the vehicle longitudinal direction by the headrest moving section. When the pressure/flexure detecting section, that is provided at the vehicle front side of the seat back, detects at least one of the pressure that is applied to the seat back from the back portion of a passenger seated in the seat and the flexure of the seat back, the control section estimates the current back-set, that is a distance between the head portion of the passenger and the headrest main body in a horizontal direction, on the basis of at least one of pressure and flexure detected by the pressure/flexure detecting section and a predetermined relationship between back-set and the at least one of pressure and flexure, and the control section controls the headrest moving section to move the headrest main body such that the back-set becomes a predetermined amount.

In this way, the pressure/flexure detecting section, that detects at least one of the flexure and the pressure that is applied to the seat back from the back portion of a passenger seated in the seat, is provided, and the current back-set is estimated on the basis of the detected at least one of pressure and flexure, and the headrest main body is moved such that the back-set becomes the predetermined amount. Therefore, the position of the headrest can be adjusted to an appropriate state, stably and in a short time and by an inexpensive structure.

Further, a second aspect of the present invention provides the headrest device of the first aspect, further including an angle detecting section that detects a reclining angle of the seat back, wherein the control section estimates the current back-set on the basis of at least one of pressure and flexure detected by the pressure/flexure detecting section, and the reclining angle detected by the angle detecting section, and a predetermined relationship between the back-set and the reclining angle and the at least one of pressure and flexure.

The current back-set is estimated by also including the reclining angle of the seat back. Therefore, the accuracy of estimating the back-set can be improved.

Moreover, a third aspect of the present invention provides the headrest device of the first aspect, further including:

an angle detecting section that detects a reclining angle of the seat back; and a seat back moving section that moves the seat back so as to change the reclining angle of the seat back, wherein the control section controls movement of the headrest main body such that the back-set becomes a predetermined amount, after the control section controls the seat back moving section to move the seat back until the at least one of pressure and flexure detected by the pressure/flexure detecting section becomes a predetermined value or until the reclining angle becomes a predetermined angle prescribed in advance.

Due thereto, the current back-set is estimated by using the pressure value that is applied to the seat back at the time when the reclining angle of the seat back has been adjusted appropriately. Therefore, the position of the headrest can be adjusted to a more appropriate state.

Further, a fourth aspect of the present invention provides the headrest device of the first aspect, wherein the pressure/flexure detecting section is a pressure sensor, a load cell, or a potentiometer.

Due thereto, the structure can be made to be inexpensive as compared with a structure in a case in which the electrostatic capacity between the headrest and the head portion is detected.

Moreover, a fifth aspect of the present invention provides the headrest device of the first aspect, wherein the pressure/detecting section is disposed at a position corresponding to at least one of a pelvic region and a range of a fourth thoracic vertebra through eighth thoracic vertebra of a passenger seated in the seat.

At these positions, there is little fluctuation in the pressure that is applied to the seat back, with respect to changes in the posture of the passenger. Therefore, the at least one of pressure and flexure can be detected more stably.

Further, a sixth aspect of the present invention provides the headrest device of the first aspect, wherein the control section controls the headrest moving section to move the headrest main body such that the back-set becomes a predetermined amount, after pressures that have been detected a plurality of times by the pressure/flexure detecting section converge, or after flexures that have been detected a plurality of times by the pressure/flexure detecting section converge.

Moreover, a seventh aspect of the present invention provides the headrest device of the first aspect, wherein the control section controls the headrest moving section to move the headrest main body such that the back-set becomes a predetermined amount, when a difference between a pressure detected by the pressure/flexure detecting section and a pressure detected again after a predetermined time is less than or equal to a predetermined value, or when a difference between a flexure detected by the pressure/flexure detecting section and a flexure detected again after a predetermined time is less than or equal to a predetermined value.

Due thereto, the detected at least one of pressure and flexure becoming an inappropriate value due to a momentary movement of the head portion or the like, and the estimation of the current back-set becoming unreliable, can be prevented, and the position of the headrest can be adjusted more stably.

Further, an eighth aspect of the present invention provides the headrest device of the first aspect, wherein, when at least one of the pressure and flexure detected by the detecting section exceeds a predetermined range, the control section controls the headrest moving section to move the headrest main body such that the back-set becomes a predetermined amount again.

Due thereto, the position of the headrest is adjusted appropriately not only when the passenger sits in the seat, but also when the back-set changes.

Moreover, when the at least one of the pressure and the flexure exceeds the predetermined range, the position of the headrest is adjusted again. Therefore, the annoyance of the position of the headrest being adjusted frequently due to slight changes in the back-set can be avoided.

Further, a ninth aspect of the present invention provides the headrest device of the first aspect, wherein the headrest main body has a headrest rear section that is supported at the upper end portion of the seat back, and a headrest front portion that is provided so as to be able to approach and move away from the headrest rear portion and is movable in the vehicle longitudinal direction between a fully closed position, at which the headrest front portion is nearest to the headrest rear portion, and a fully open position, at which the headrest front portion is furthest away from the headrest rear portion, and the headrest moving section moves the headrest main body in the vehicle longitudinal direction by moving the headrest front portion between the fully open position and the fully closed position.

Moreover, a tenth aspect of the present invention provides a method of adjusting headrest position including:

by a pressure/flexure detecting section that is provided at a vehicle front side of a seat back of a seat in which a passenger sits, detecting at least one of pressure applied to the seat back from a back portion of a passenger seated in the seat, and flexure of the seat back;

estimating a current back-set, that is a distance between a head portion of a passenger and a headrest main body in a horizontal direction, on the basis of at least one of pressure and flexure detected by the pressure/flexure detecting section and a predetermined relationship between back-set and the at least one of pressure and flexure; and by a moving section, moving the headrest main body, that is provided at an upper end portion of the seat back so as to be movable in a vehicle longitudinal direction, such that the back-set becomes a predetermined amount.

Further, an eleventh aspect of the present invention provides a vehicle seat including the headrest device of the first aspect.

As described above, in accordance with the headrest device, the headrest position adjusting method and the vehicle seat relating to the present invention, the current back-set between the headrest and the head portion of the passenger is estimated on the basis of at least one of pressure applied to the seat back and flexure, and the headrest main body is moved such that the back-set becomes a predetermined amount. Due thereto, the effect is obtained that the position of a headrest can be adjusted to an appropriate state, stably and in a short time and by an inexpensive structure.

BRIEF DESCRIPTION OF THE DRAWINGS

Exemplary embodiments of the present invention will be described in detail based on the following figures, wherein.

DETAILED DESCRIPTION

Exemplary embodiments of a case in which the present invention is applied to a headrest device for a vehicle are described in detail hereinafter with reference to the drawings.

Figure 1:
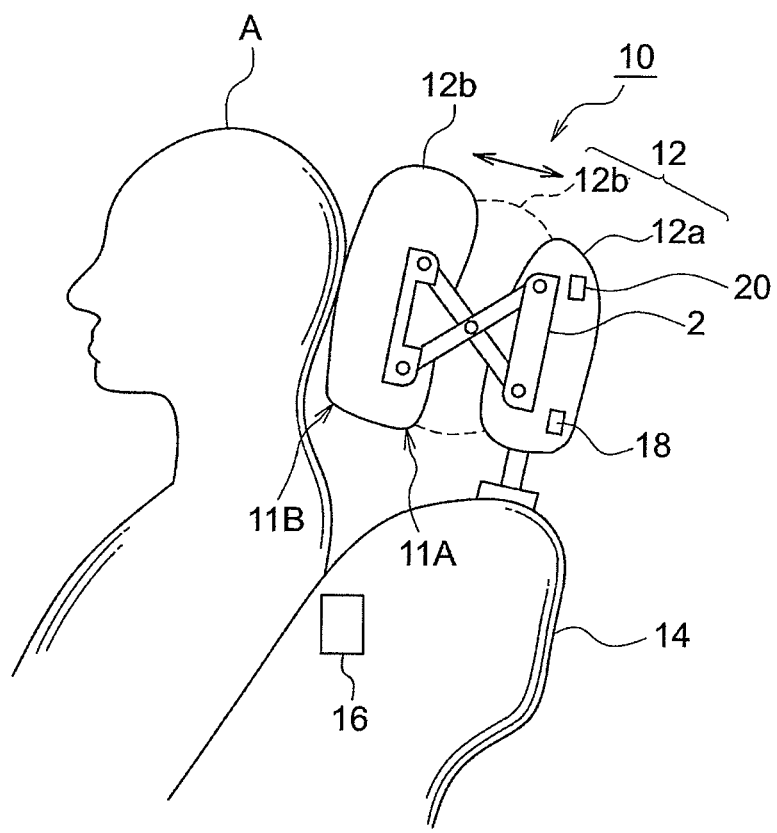
FIG. 1 is a schematic drawing showing a headrest device relating to a first exemplary embodiment.

As shown in FIG. 1, a headrest device 10 of a first exemplary embodiment has a headrest main body 12, a pressure sensor 16 that detects pressure applied to a seat back, a headrest operation amount sensing sensor 18 for detecting an amount of movement (amount of operation) of a headrest front portion 12b, and a headrest controlling ECU (Electronic Control Unit) 20.

The headrest main body 12 has a headrest rear portion 12a and the headrest front portion 12b. The headrest rear portion 12a is supported at the upper end portion of a seat back 14 of a seat in which a passenger A sits. The headrest front portion 12b is provided so as to be able to approach and move away from the headrest rear portion 12a, and is movable within a predetermined range from a fully closed position 11A at which the headrest front portion 12b is nearest to the headrest rear portion 12a, and a fully open position 11B at which the headrest front portion 12b is furthest away from the headrest rear portion 12a. Note that, in the example of FIG. 1, the position of the headrest front portion 12b that is shown by the dashed lines is the fully closed position 11A, and the position of the headrest front portion 12b shown by the solid lines is the fully open position 11B.

Here, the headrest main body 12 will be described in further detail. As described above, the headrest main body 12 has the headrest front portion 12b that is disposed at the vehicle front side, and the headrest rear portion 12a that is disposed at the vehicle rear side, and has, at the interior thereof, a driving mechanism 2 for driving the headrest front portion 12b in the front-back direction. Due to the driving mechanism 2 being driven, the headrest front portion 12b is moved back-and-forth in the longitudinal direction of the vehicle with respect to the headrest rear portion 12a, and the distance between the head portion of the passenger and the headrest front portion 12b is controlled. More concretely, the back-set (the magnitude of the back-set), that is the distance in the horizontal direction between the head portion of the passenger and the headrest front portion 12b, is controlled.

Figure 2:
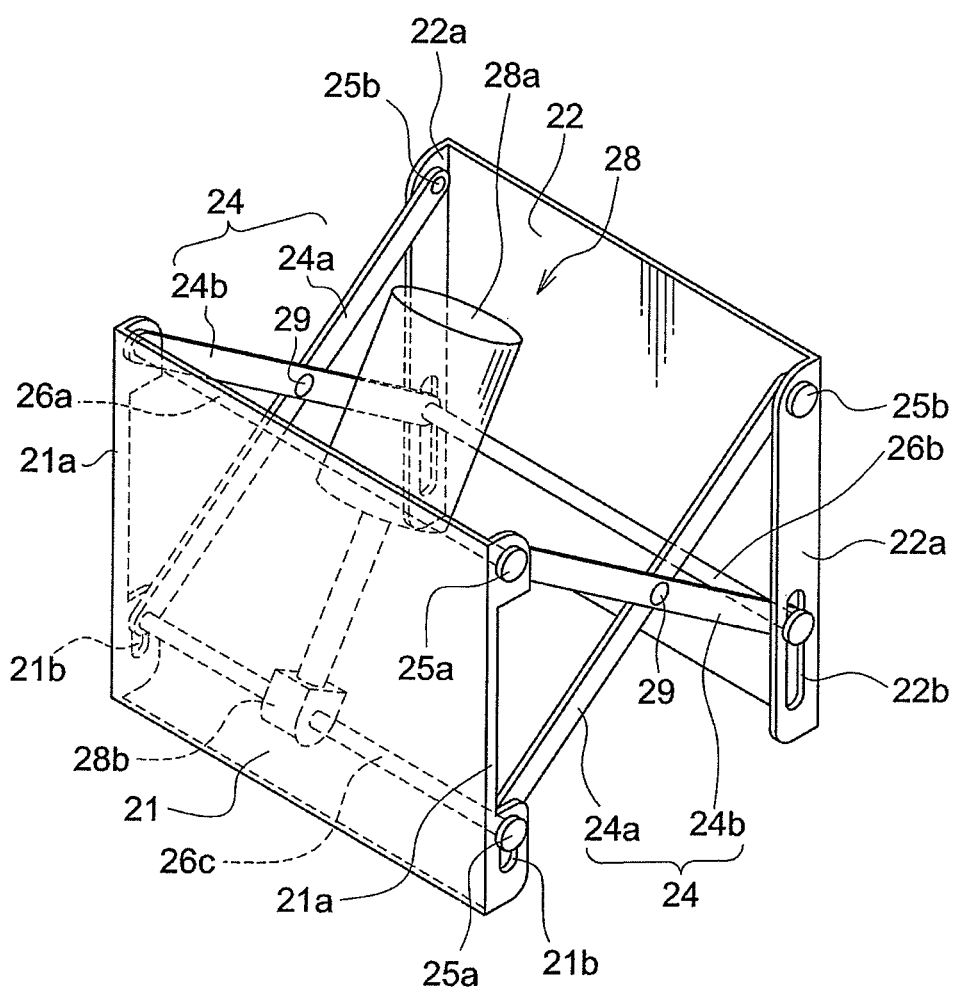
FIG. 2 is a perspective view showing the schematic structure of a driving mechanism relating to the first exemplary embodiment.

An example of a structural drawing of the driving mechanism 2 is shown in FIG. 2. A pair of front and back bases 21, 22 are connected by left and right pairs of X-shaped links 24. The one base 21 is joined to the interior of the headrest front portion 12b that is at the front surface side, and the other base 22 is joined to the headrest rear portion 12a that is at the rear surface side. Further, each of the pair of links 24 is formed from two link members 24a, 24b. The substantially central portions of the link members 24a, 24b are rotatably connected by pins 29. The both end portions of the link members 24a, 24b are connected respectively to side portions 21a, 22a that are provided integrally at the both sides of the both bases 21, 22.

The front end portions of the pair of link members 24a are connected to one another by a shaft 26c. The both end portions of the shaft 26c are slidably connected to guide holes 21b that are vertically long and are formed in the side portions 21a of the base 21. The rear end portions of the link members 24a are rotatably connected by pins 25b to the side portions 22a of the base 22.

On the other hand, the front end portions of the pair of links 24b are connected to one another by a shaft 26a, and the rear end portions are connected to one another by a shaft 26b. The front end portions of the links 24b are rotatably connected to the side portions 21a of the base 21 by pins 25a. The both end portions of the shaft 26b are slidably connected to guide holes 22b that are vertically long and are formed in the side portions 22a of the base 22.

The base 22 at the back surface side has an electric-power unit 28 that is the drive source of the driving mechanism 2. A motor 28a of the electric-power unit 28 is mounted to the inner side of the base 22. Further, the drive shaft of the motor 28a is connected to the shaft 26c via a ball screw portion 28b. The forward and backward rotation of the motor 28a is converted into raising and lowering operations of the shaft 26c by the function of the ball screw portion 28b. Accordingly, on the basis of the driving control of the electric-power unit 28, the both X-shaped links 24 operate as pantographs, and the base 21 moves relative to the base 22.

Note that the driving mechanism 2 shown in FIG. 2 is an example of the mechanism for moving the headrest front portion 12b. Any mechanism may be used provided that it is a mechanism that moves the headrest front portion 12b with respect to the headrest rear portion 12a.

Figure 3:
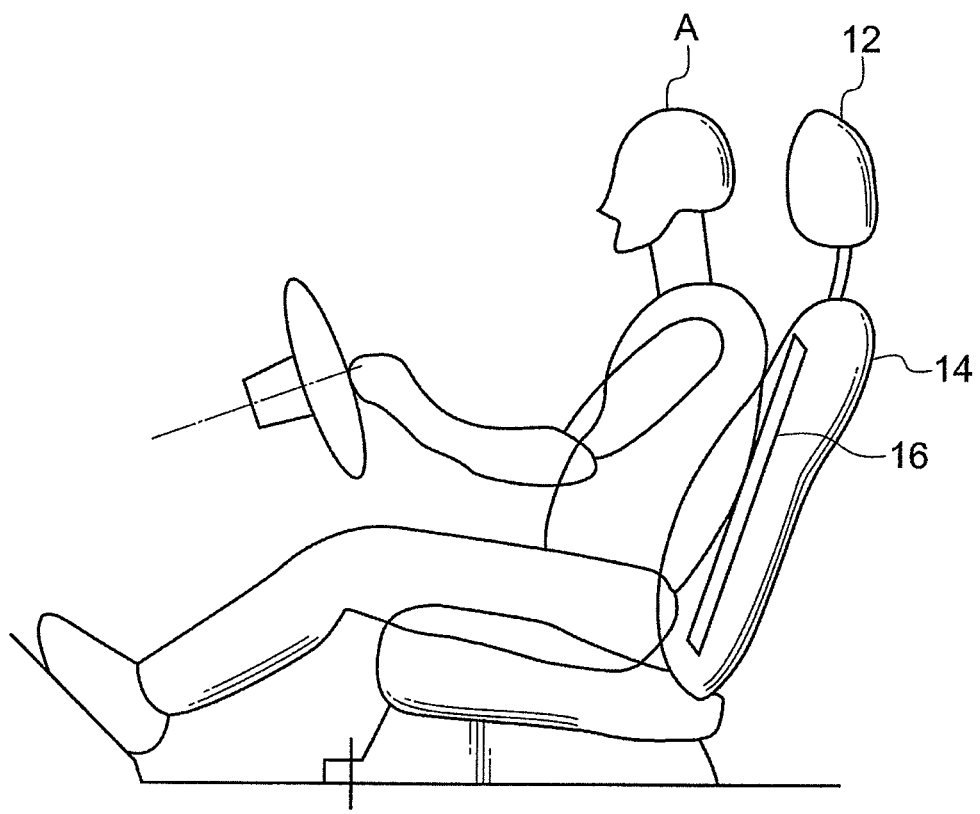
FIG. 3 is a schematic drawing for explaining the placement of a pressure sensor.

The pressure sensor 16 is provided at the vehicle front side of the seat back 14, and detects pressure that is applied to the seat back 14 from the back portion of the passenger A seated in the seat, and outputs a detection signal, that corresponds to the detected pressure, to the headrest controlling ECU 20. As shown in FIG. 3, a sheet-shaped pressure sensor sheet, that is disposed over the entire surface of the vehicle front side of the seat back 14, can be used as the pressure sensor 16.

The headrest operation amount sensing sensor 18 detects the amount of movement (amount of operation) of the headrest front portion 12b from the fully closed position 11A, and outputs a detection signal, that expresses the detected movement amount, to the headrest controlling ECU 20. For example, a potentiometer, a linear sensor, a rotary encoder or the like can be used as the headrest operation amount sensing sensor 18.

Figure 4:
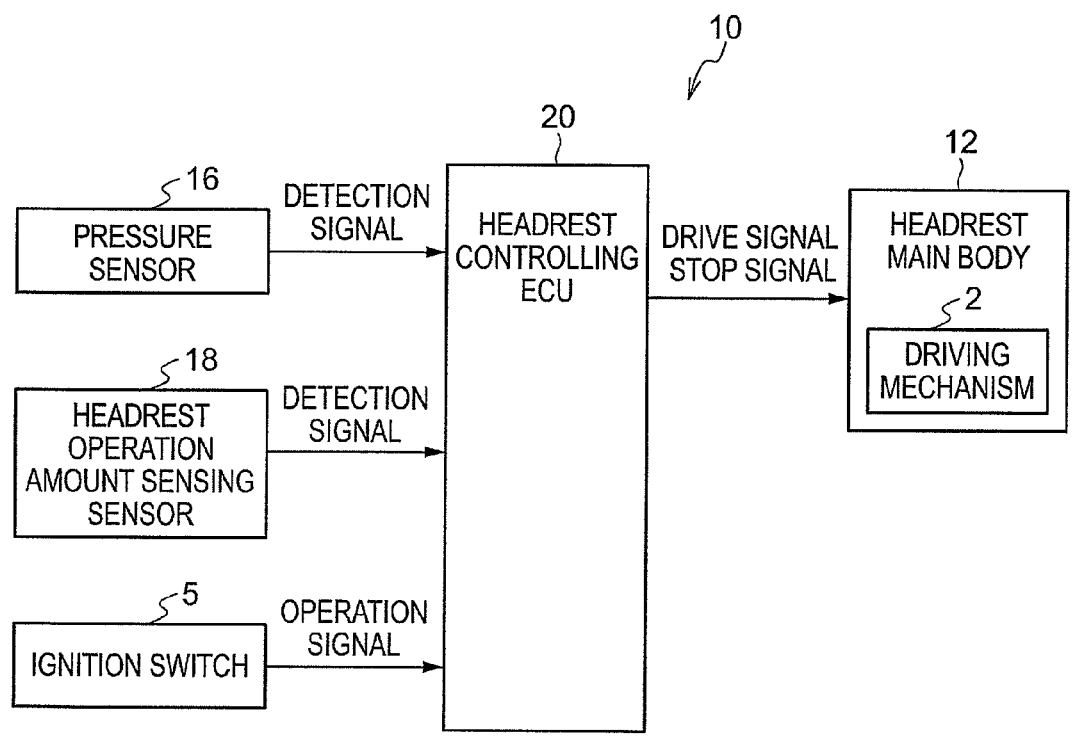
FIG. 4 is a block diagram showing the structure of the electrical system of the headrest device relating to the first exemplary embodiment.

As shown in FIG. 4, the pressure sensor 16, the headrest operation amount sensing sensor 18, an ignition switch 5, and the driving mechanism 2 (more specifically, the motor 28a of the driving mechanism 2) are connected to the headrest controlling ECU 20. The headrest controlling ECU 20 has a ROM (Read Only Memory) that serves as a storage medium (storage section) and that stores basic programs such as the OS and the like and programs for executing a headrest position control processing routine that is described in detail later and the like, a CPU (Central Processing Unit) that governs the control of the entire headrest device 10, a RAM (Random Access Memory) in which various types of data are temporarily stored, and an I/O (input/output) port. The ROM, CPU, RAM and I/O port are connected to one another by a bus.

The pressure sensor 16, the headrest operation amount sensing sensor 18, the ignition switch 5 and the motor 28*a* are connected to the I/O port. Note that the ignition switch 5, when on, outputs an operation signal expressing on, and, when off, outputs an operation signal expressing off.

A back-set set value, that is an appropriate value of the back-set between the head portion of the passenger and the headrest, is stored in the ROM. The smaller the back-set, the better the ability to restrain the head portion of the passenger at the time of a rear collision or the like, but, on the other hand, the smaller the distance between the head portion of the passenger and the headrest, the more bothersome it is to the passenger. Further, the greater the back-set, the more comfortable it is for the passenger, but, on the other hand, the lower the ability to restrain the head portion of the passenger at the time of a rear collision or the like. Thus, an appropriate value, that takes into consideration a balance between the ability to restrain the head portion of the passenger and the comfort of the passenger, is determined in advance as the back-set set value. The back-set set value can be made to be, for example, 35 mm.

Figure 5:
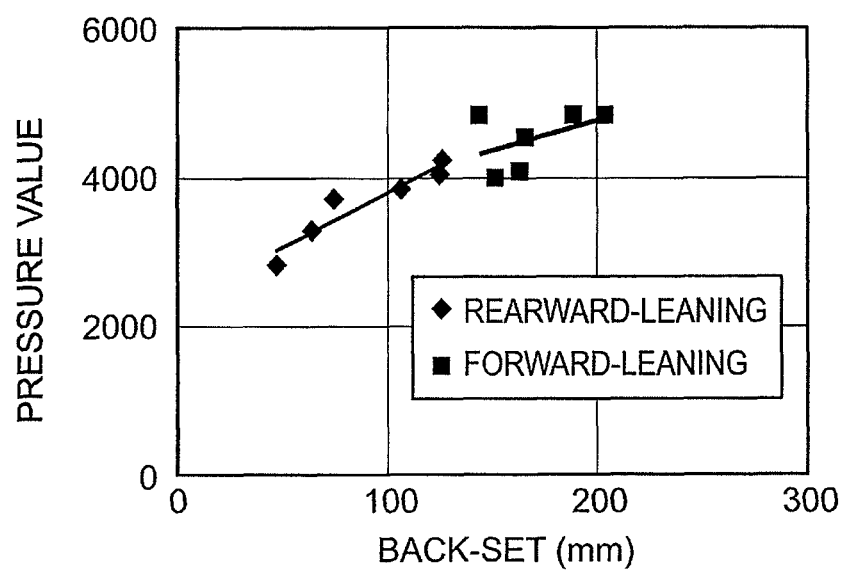
FIG. 5 is a diagram showing an example of a pressure—back-set table.

Further, a pressure—back-set table, that prescribes the relationship between the pressure applied to the seat back when a passenger sits in the seat and the back-set at that time, is stored in the ROM. As shown in FIG. 5 for example, the pressure—back-set table can prescribe the relationship between back-sets and pressure values that have been actually measured when a passenger sits in the seat. Note that, in the pressure—back-set table shown in FIG. 5, the marks indicated by the black diamonds are plotted points expressing the relationship between pressure values and back-sets that have been measured from a passenger who has a tendency to lean rearward when sitting in the seat, and the marks indicated by the black squares are plotted points expressing the relationship between pressure values and back-sets that have been measured from a passenger who has a tendency to lean forward.

Figure 6:
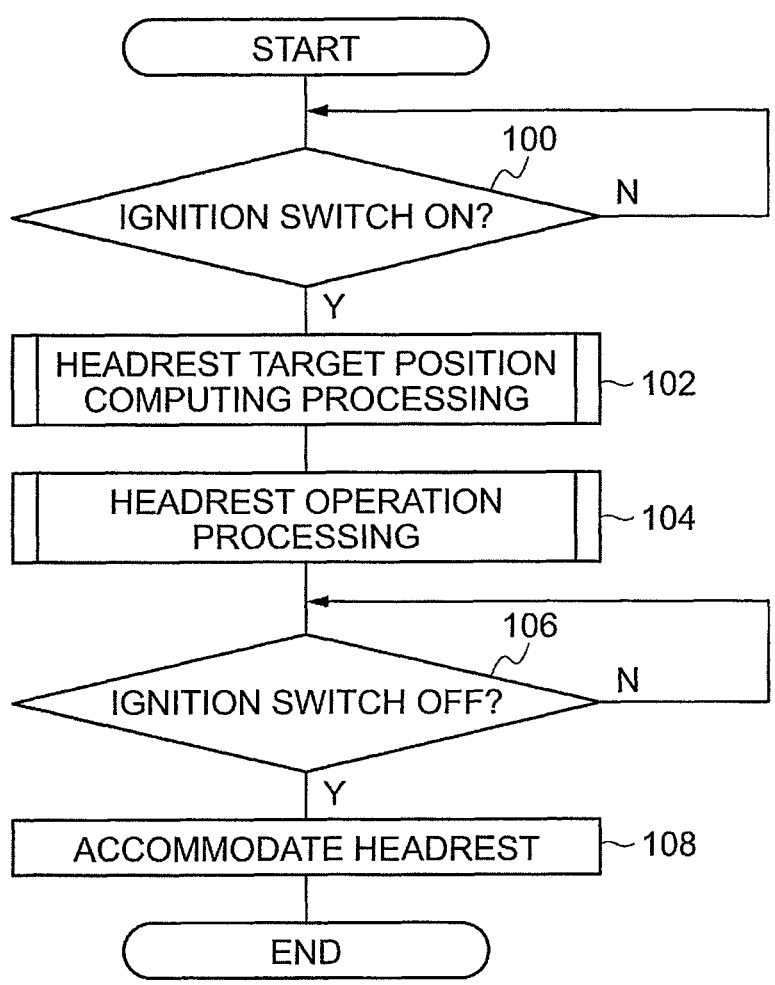
FIG. 6 is a flowchart showing the contents of a headrest position control processing routine in the first exemplary embodiment.

Next, a processing routine of headrest position control processing, that is executed at the headrest device 10 of the first exemplary embodiment, is described with reference to FIG. 6. The present routine starts due to CPU of the headrest controlling ECU 20 executing the program of the headrest position control processing routine, that is read-out from the ROM, when electric power is supplied from an unillustrated power source to the headrest controlling ECU 20. Note that, here, a case is described in which the position of the headrest front portion 12*b* at the time of the start of the present routine (the initial position) is the fully closed position 11A.

In step 100, the operation signal of the ignition switch 5 is taken-in, and it is judged whether or not the ignition switch 5 is on. When the ignition switch 5 is on, the routine moves on to step 102. Note that, in consideration of the time until the posture of the passenger becomes stable, the routine may move on to the next step after a predetermined time elapses from the ignition switch 5 turning on. On the other hand, if the ignition switch 5 is off, the judgment of the present step is repeated until it is judged that the ignition switch 5 is on.

In step 102, a headrest target position computing processing that is described later is executed, and the target position of the headrest is computed. Next, in step 104, a headrest operation processing that is described later is executed, and the headrest is moved to the target position.

Next, in step 106, the operation signal of the ignition switch 5 is taken-in, and it is judged whether or not the ignition switch 5 is off. When the ignition switch 5 is off, the routine moves on to step 108. When the ignition switch 5 is on, the judgment of the present step is repeated until it is judged that the ignition switch 5 is off.

In step 108, the motor 28*a* is controlled, the headrest front portion 12*b* is moved to the fully closed position 11A, the headrest front portion 12*b* is accommodated at the initial position, and processing ends.

Figure 7:
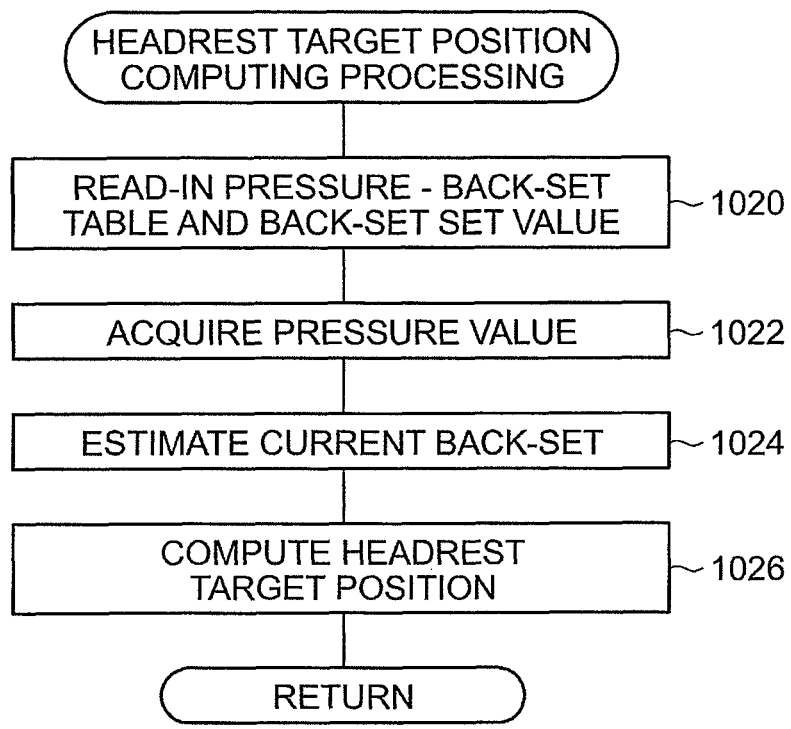
FIG. 7 is a flowchart showing the contents of a headrest target position computing processing routine in the first exemplary embodiment.

Next, the headrest target position computing processing routine that is executed in step 102 of the headrest position control processing (FIG. 6) is described with reference to FIG. 7.

In step 1020, the pressure—back-set table and the back-set set value that are stored in the ROM are read-in. Next, in step 1022, the detection signal detected by the pressure sensor 16 is read-in, and the pressure value is acquired.

Next, in step 1024, by referring to the pressure—back-set table that was read-in in step 1020, the back-set that corresponds to the pressure value acquired in step 1022 is estimated as the current back-set.

Next, in step 1026, the target position of the headrest is computed on the basis of the back-set set value that was read-in in step 1020 and the current back-set that was estimated in step 1024. As shown schematically in FIG. 8, the target position of the headrest is the position at which the back-set becomes the back-set set value. The target position of the headrest can be computed as the amount of movement for moving the headrest by an amount corresponding to the difference obtained by subtracting the back-set set value from the estimated back-set. After the headrest target position is computed, the routine returns to the headrest position control processing routine.

Figure 9:
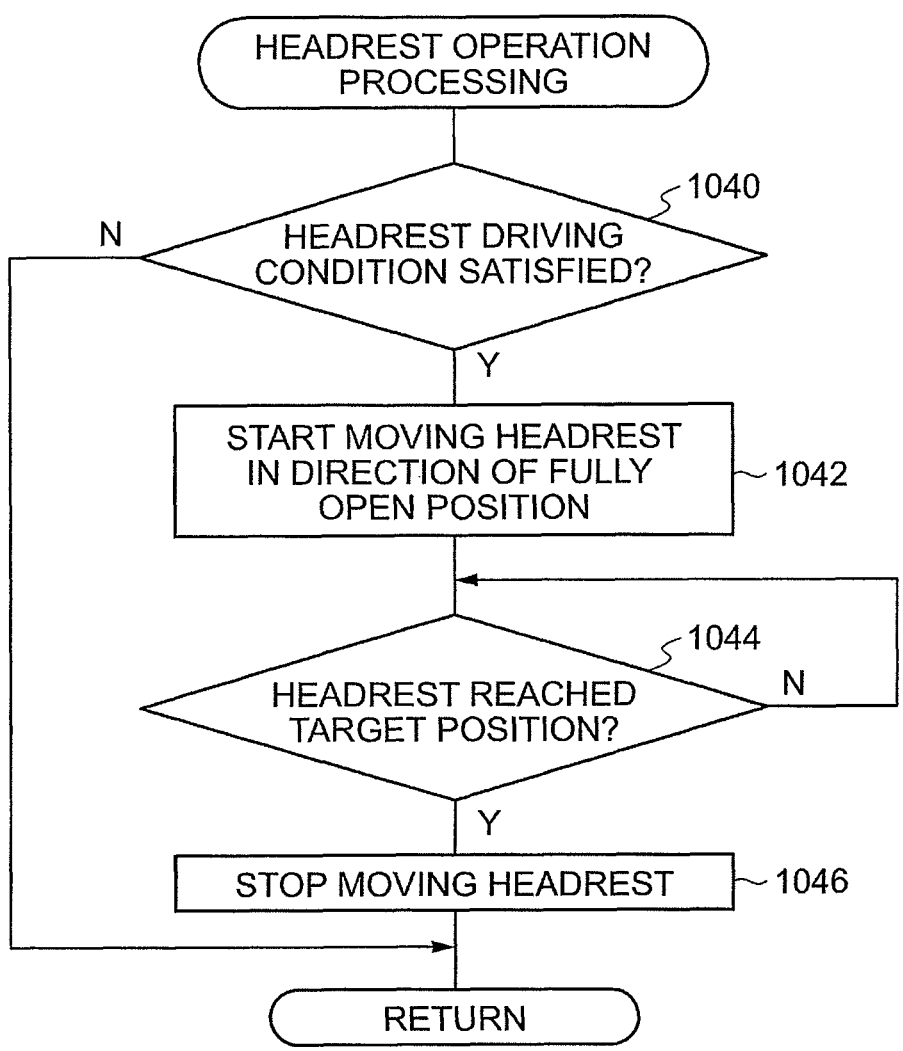
FIG. 9 is a flowchart showing the contents of a headrest operation processing routine in the first exemplary embodiment.

The headrest operation processing routine, that is executed in step 104 of the headrest position control processing (FIG. 6), is described next with reference to FIG. 9.

In step 1040, it is judged whether or not a headrest driving condition is satisfied. Here, the headrest driving condition being satisfied means a case in which the reclining angle of the seat back 14 is within an appropriate range. Concretely, a sensor is provided that detects whether or not the reclining angle of the seat back 14 is within an appropriate range, or whether or not the reclining angle of the seat back 14 has been adjusted and has fallen outside of the appropriate range, and judgment is carried out in accordance with the detected value of this sensor. When the headrest driving condition is satisfied, the routine moves on to step 1042. When the headrest driving condition is not satisfied, the routine returns to the headrest position control processing routine without carrying out position control of the headrest.

In step 1042, the motor 28*a* is controlled, and the headrest front portion 12*b* is made to start moving from the fully closed position 11A in the direction to the fully open position 11B.

Next, in step 1044, the detection signal from the headrest operation amount sensing sensor 18 is taken-in, and, on the basis of the movement amount that the taken-in detection signal expresses, it is judged whether or not the headrest front portion 12*b* has reached the target position. If the headrest front portion 12*b* has reached the target position, the routine moves on to step 1046. If the headrest front portion 12*b* has not reached the target position, the judgment of the present step is repeated until the target position is reached.

Figure 8:
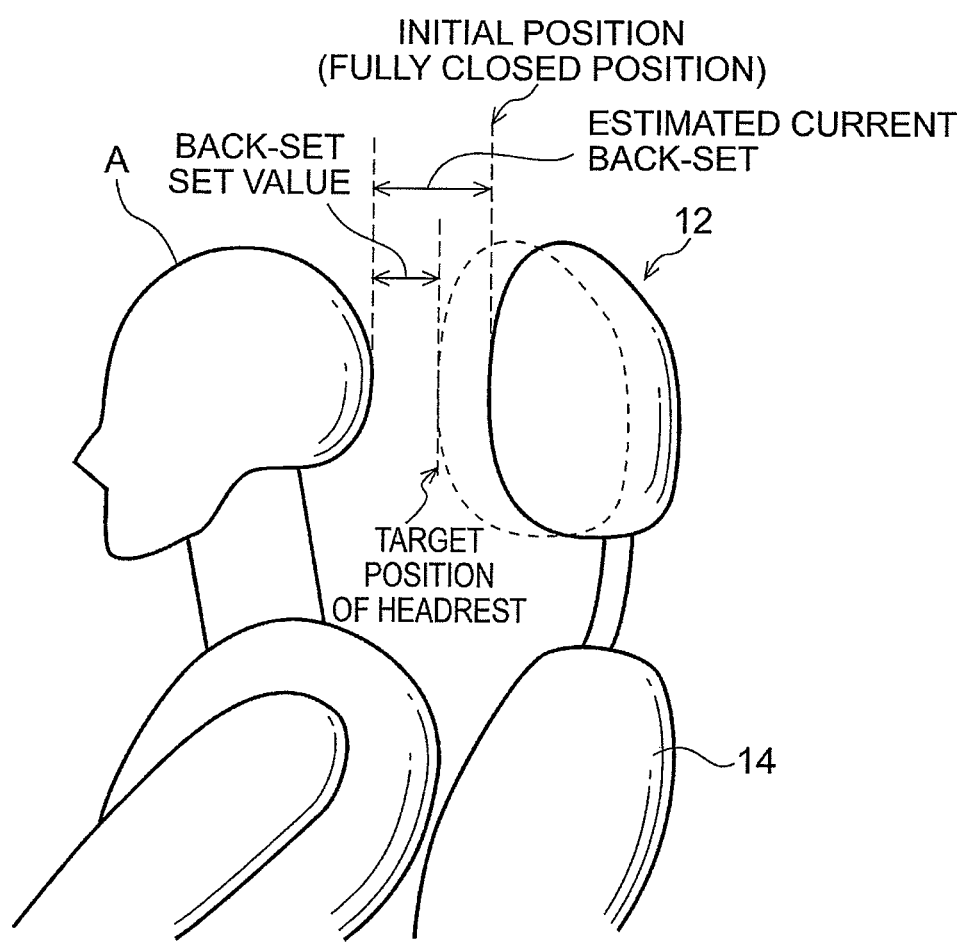
FIG. 8 is a diagram for explaining adjusting of a headrest to a target position.

In step 1046, the motor 28*a* is controlled, and movement of the headrest front portion 12*b* is stopped. Due thereto, movement of the headrest front portion 12*b* stops, and the magnitude of the back-set becomes an appropriate magnitude (the back-set set value). The dashed lines in FIG. 8 show the state of the headrest at which the back-set has been adjusted to the back-set set value. After the position of the headrest has been adjusted, the routine returns to the headrest position control processing routine.

As described above, in accordance with the headrest device of the first exemplary embodiment, the pressure—back-set table, in which the relationship between pressures applied to the seat back and back-sets is prescribed, is referred to, and the back-set that corresponds to the pressure value that is detected by the pressure sensor is estimated to be the current back-set, and the position of the headrest is adjusted such that the back-set becomes the appropriate back-set (the back-set set value). Therefore, the position of the headrest can be adjusted to an appropriate state, stably and in a short time and by an inexpensive structure.

A headrest device 210 of a second exemplary embodiment is described next. The second exemplary embodiment is an embodiment in which the back-set is estimated by also taking into consideration the reclining angle of the seat back 14. Note that structures that are similar to those of the headrest device 10 of the first exemplary embodiment are denoted by the same reference numerals, and description thereof is omitted.

Figure 10:
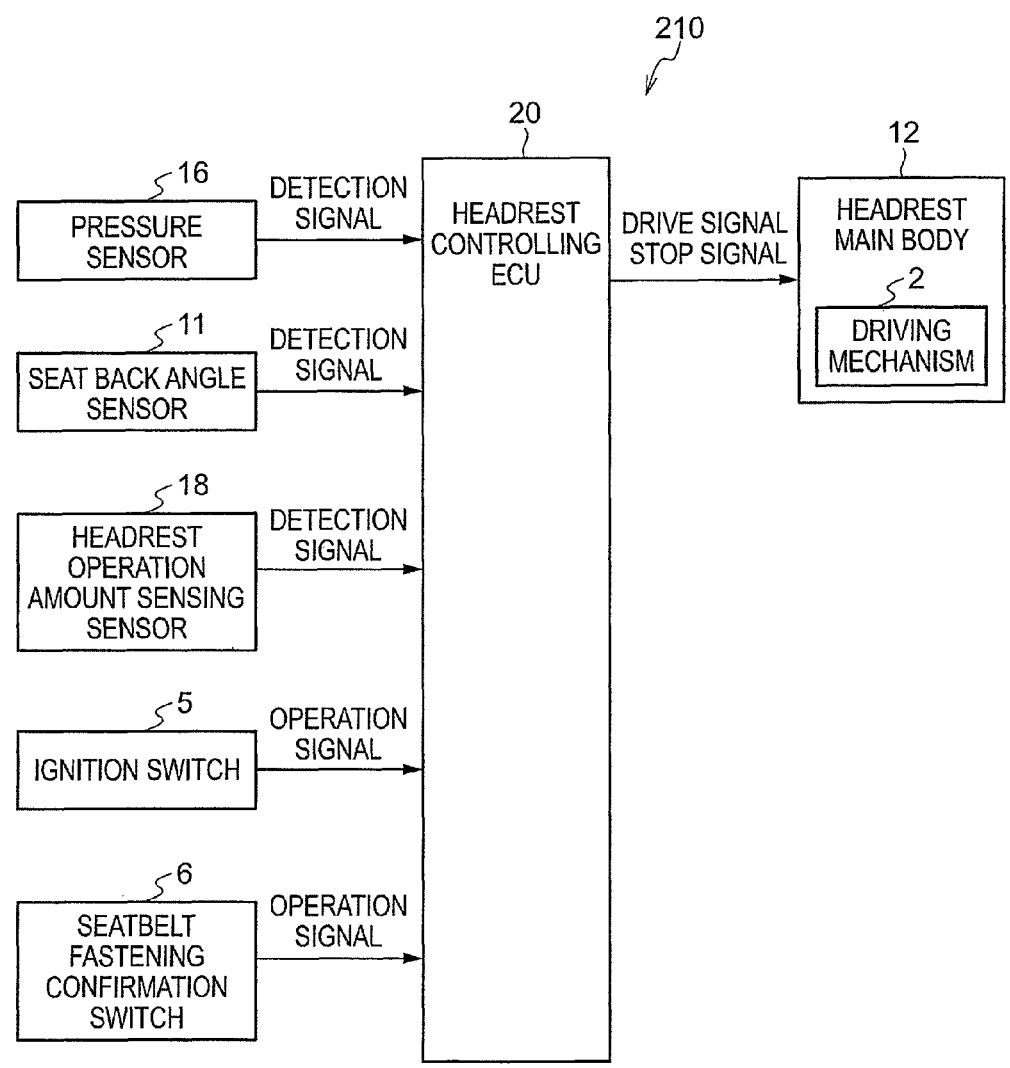
FIG. 10 is a block diagram showing the structure of the electrical system of a headrest device relating to a second exemplary embodiment.

As shown in FIG. 10, the headrest device 210 of the second exemplary embodiment has the headrest main body 12, the pressure sensor 16, a seat back angle sensor 17 that detects the reclining angle of the seat back 14, the headrest operation amount sensing sensor 18, and the headrest controlling ECU 20.

The seat back angle sensor 17 is for detecting the reclining angle of the seat back 14 with respect to the vertical direction. The seat back angle sensor 17 outputs, to the headrest controlling ECU 20, a detection signal expressing the detected reclining angle. For example, an acceleration sensor or the like can be used as the seat back angle sensor 17.

Further, a seatbelt fastening confirmation switch 6 is connected to the headrest controlling ECU 20. The seatbelt fastening confirmation switch 6 outputs an operation signal expressing on when the seatbelt is fastened, and outputs an operation signal expressing off when the seatbelt is not fastened.

The ROM stores the back-set set value, as well as a pressure—torso angle table that prescribes, for each reclining angle, the relationship between the pressure that is applied to the seat back at the time when a passenger sits in the seat and the torso angle that is the angle of inclination of the torso central line of the passenger with respect to a vertical line at that time. Pressure values and torso angles when a passenger sits in the seat are measured at plural reclining angles, and the pressure—torso angle table prescribes these relationships in advance.

Figure 11:
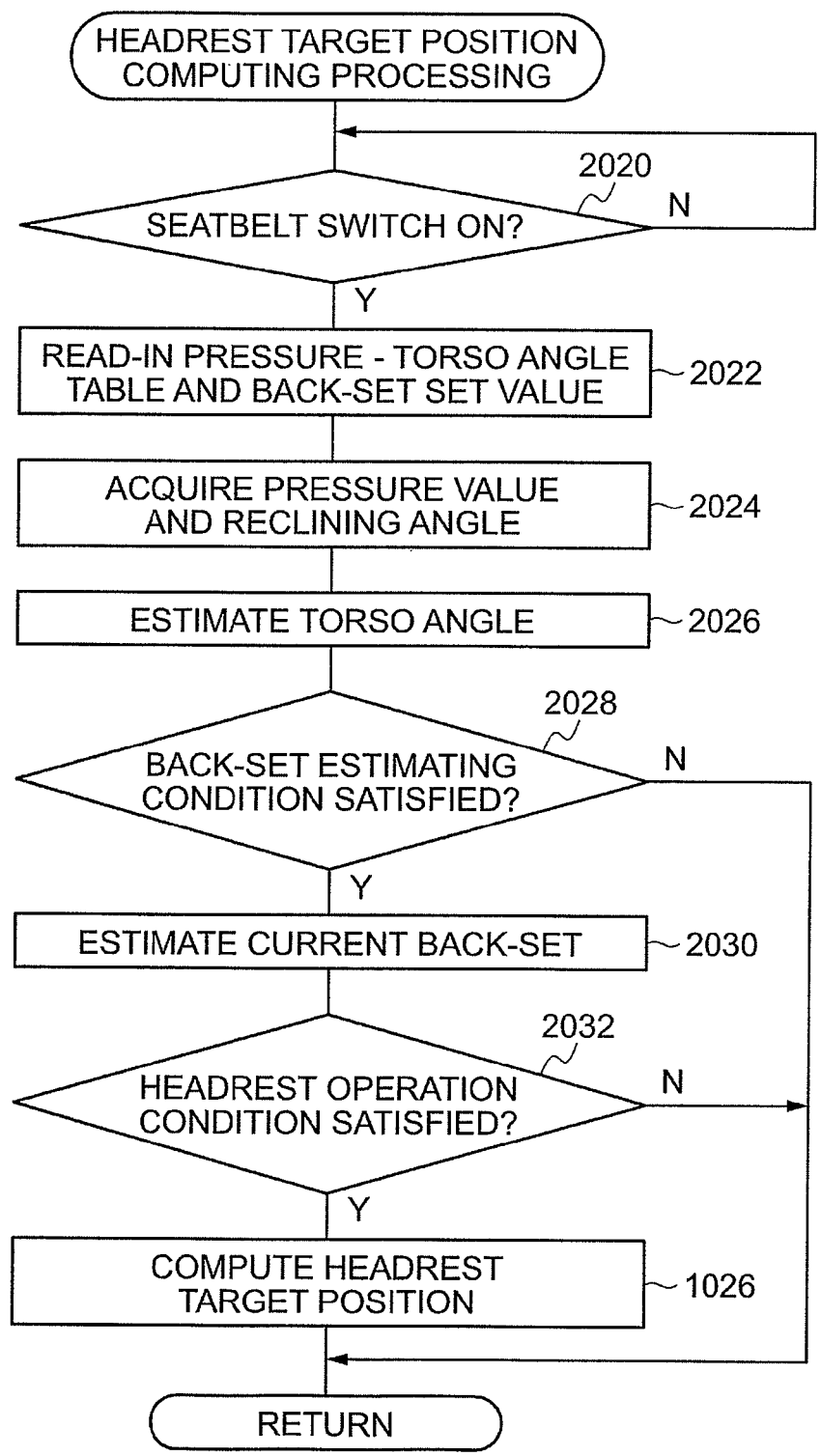
FIG. 11 is a flowchart showing the contents of a headrest target position computing processing routine in the second exemplary embodiment.

The headrest position control processing in the second exemplary embodiment is described next. In the headrest position control processing in the second exemplary embodiment, only the headrest target position computing processing, that is executed in step 102 of the headrest position control processing (FIG. 6) of the first exemplary embodiment, differs. Therefore, here, the headrest target position computing processing routine of the second exemplary embodiment is described with reference to FIG. 11. Further, processings that are the same as those of the headrest target position computing processing of the first exemplary embodiment are denoted by the same reference numerals, and detailed description thereof is omitted.

In step 2020, the operation signal of the seatbelt fastening confirmation switch 6 is taken-in, and, by judging whether or not the seatbelt fastening confirmation switch 6 is on, it is judged whether or not the passenger is seated in the seat and has fastened his/her seatbelt. When the seatbelt fastening confirmation switch 6 is on, the routine moves on to step 2022. Note that, in consideration of the time until the posture of the passenger becomes stable after fastening the seatbelt, the routine may move on to the next step after a predetermined time elapses from the seatbelt fastening confirmation switch 6 turning on. On the other hand, if the seatbelt fastening confirmation switch 6 is off, the judgment of the present step is repeated until it is judged that the seatbelt fastening confirmation switch 6 is on.

In step 2022, the pressure—torso angle table and the back-set set value that are stored in the ROM are read-in. Next, in step 2024, the detection signal detected at the pressure sensor 16, and the detection signal detected at the seat back angle sensor, are taken-in, and the pressure value and the reclining angle are acquired.

Next, in step 2026, by referring to the pressure—torso angle table that was read-in in step 2022, a torso angle, that corresponds to the pressure value and the reclining angle that were acquired in step 2024, is estimated as the current torso angle of the passenger.

Next, in step 2028, it is judged whether or not a back-set estimation condition is satisfied. Here, the back-set estimation condition being satisfied means that the torso angle is less than a predetermined angle. The predetermined angle prescribes in advance, for example, an angle for judging a torso angle that shows a state in which the passenger is horizontal and is resting. If the torso angle is greater than or equal to the predetermined angle, there is no need to adjust the position of the headrest, and therefore, there also is no need to estimate the current back-set. When the back-set estimation condition is satisfied, the routine moves on to step 2030. When the back-set estimation condition is not satisfied, the routine returns to the headrest position control processing routine, without computing the target position of the headrest.

In step 2030, the current back-set is estimated on the basis of the reclining angle acquired in step 2024 and the torso angle estimated in step 2026. Concretely, the length, from a seat surface that is determined from the seat structure to a predetermined position of the headrest, and a length, from a seat surface that is determined from a general human body model to a predetermined position of the head portion, are prescribed in advance. Then, the back-set can be computed geometrically on the basis of these lengths, the reclining angle and the torso angle, and the computed back-set can be estimated as the current back-set.

Next, in step 2032, it is judged whether or not a headrest operation condition is satisfied. The headrest operation condition being satisfied means a case in which the current back-set estimated in step 2030 and the back-set set value read-in in step 2022 are compared, and the back-set set value is smaller. If the back-set set value is larger, the position of the headrest cannot be adjusted any more than the current state, and therefore, the headrest operation condition is not satisfied. When the headrest operation condition is satisfied, the routine moves on to step 1026. When the headrest operation condition is not satisfied, the routine returns to the headrest position control processing routine without computing the target position of the headrest.

In step 1026, the target position of the headrest is computed on the basis of the back-set set value read-in in step 2022 and the current back-set estimated in step 2030, and the routine returns to the headrest position control processing routine.

As described above, in accordance with the headrest device of the second exemplary embodiment, the pressure—torso angle table, in which the relationship between pressures applied to the seat back and torso angles is prescribed, is referred to, and the current back-set is estimated on the basis of the torso angle, that corresponds to the pressure value detected at the pressure sensor, and the reclining angle of the seat back, that is detected at the seat back angle sensor. The position of the headrest is adjusted such that the back-set becomes the back-set set value that is an appropriate value. Therefore, the position of the headrest can be adjusted to an appropriate state, stably and in a short time and by an inexpensive structure.

Note that the second exemplary embodiment describes a case in which, after the torso angle is estimated by using the pressure—torso angle table, the current back-set is estimated by computation in accordance with the reclining angle. However, a pressure—back-set table per reclining angle, to which the relationship between pressure values and torso angles is added, may be prescribed in advance, and the current back-set may be estimated from the detected pressure value by using this pressure—back-set table.

A headrest device 310 of a third exemplary embodiment is described next. In the third exemplary embodiment, the reclining angle of the seat back 14 also is adjusted on the basis of the pressure applied to the seat back. Note that structures that are similar to those of the headrest device 10 of the first exemplary embodiment and the headrest device 210 of the second exemplary embodiment are denoted by the same reference numerals, and description thereof is omitted.

Figure 12:
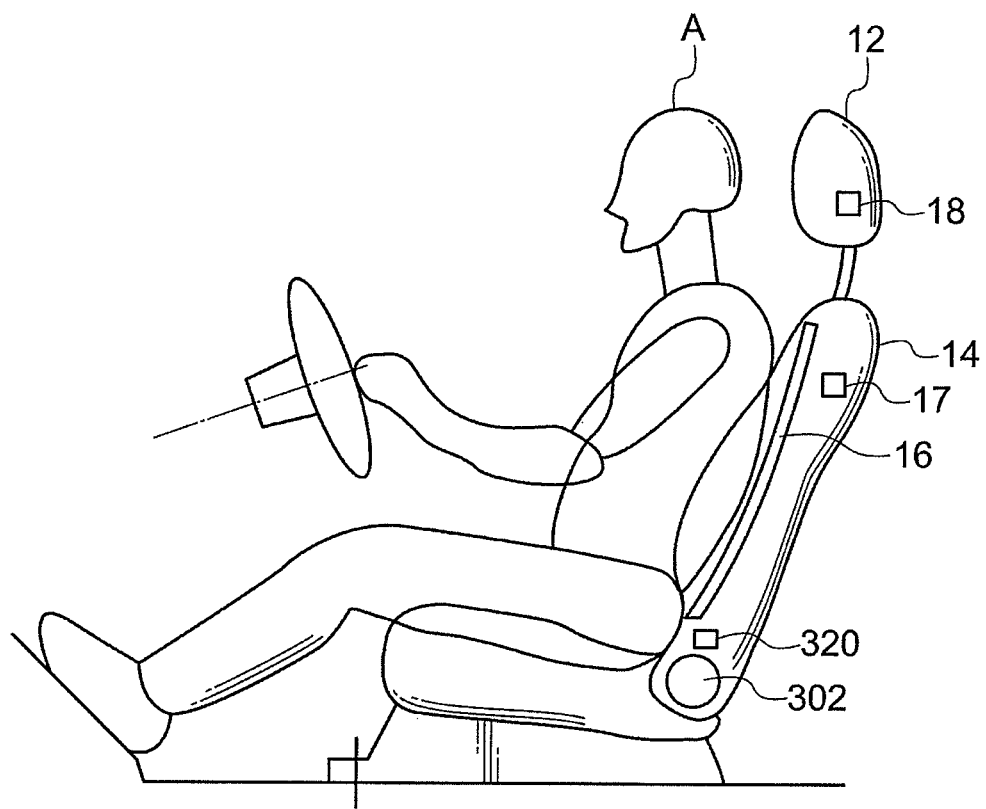
FIG. 12 is a schematic drawing showing a headrest device relating to a third exemplary embodiment.
Figure 13:
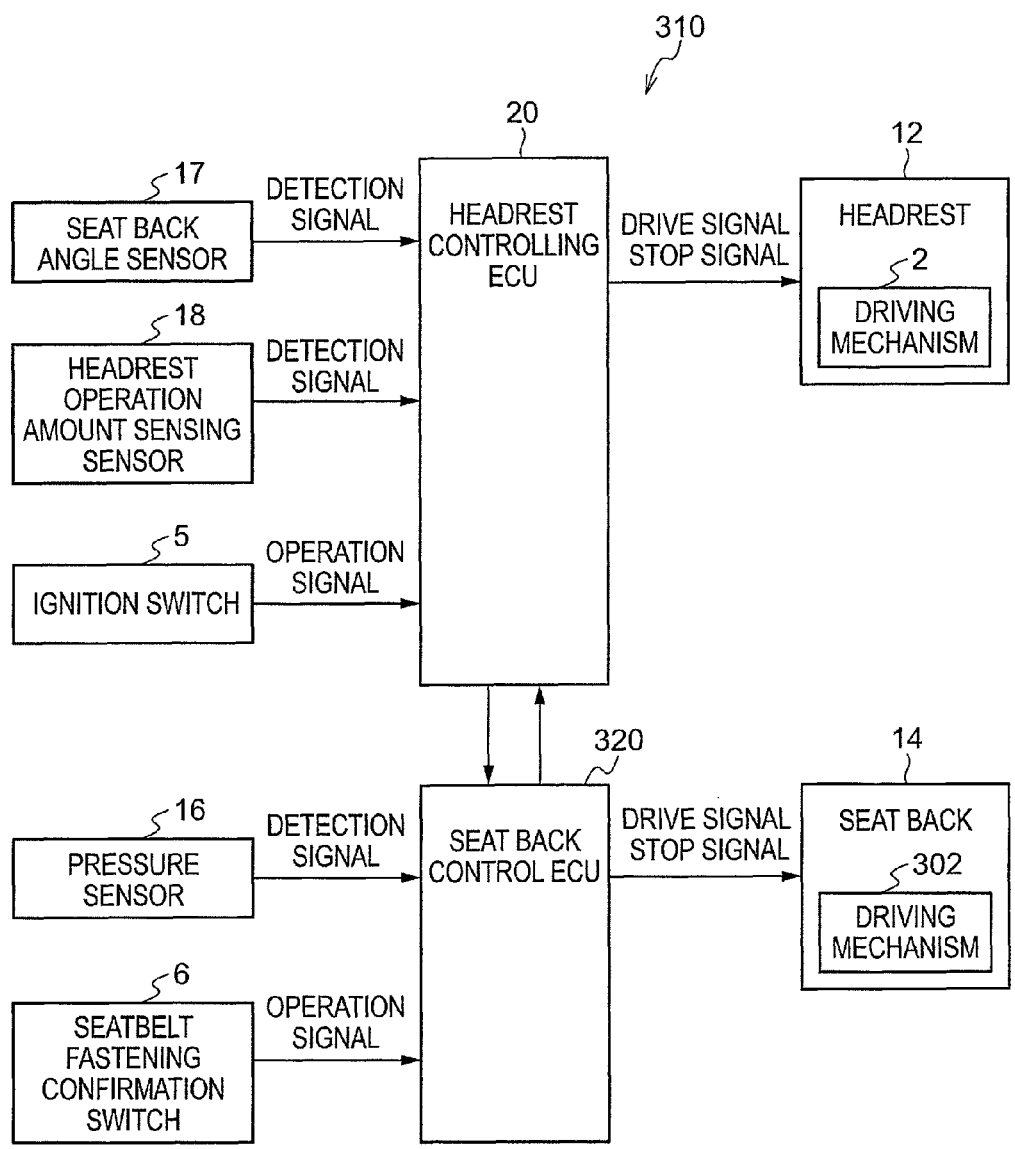
FIG. 13 is a block diagram showing the structure of the electrical system of the headrest device relating to the third exemplary embodiment.

As shown in FIG. 12 and FIG. 13, the headrest device 310 of the third exemplary embodiment has the headrest main body 12, the pressure sensor 16, the seat back angle sensor 17, the headrest operation amount sensing sensor 18, the headrest controlling ECU 20, and a seat back control ECU 320 that controls the driving of the seat back 14 and outputs, to the headrest controlling ECU 20, the detection signal detected by the pressure sensor 16.

A driving mechanism 302, that is for rotating and driving the seat back 14 with respect to the sitting surface of the seat so as to adjust the reclining angle, is provided at the lower end portion of the seat back 14. The driving mechanism 302 includes therein a power source unit (not illustrated) that includes a motor that is the drive source of the driving mechanism 302. Due to the rotation of the motor, the driving mechanism 302 is rotated and driven, and the reclining angle of the seat back 14 is adjusted.

Figure 14A:
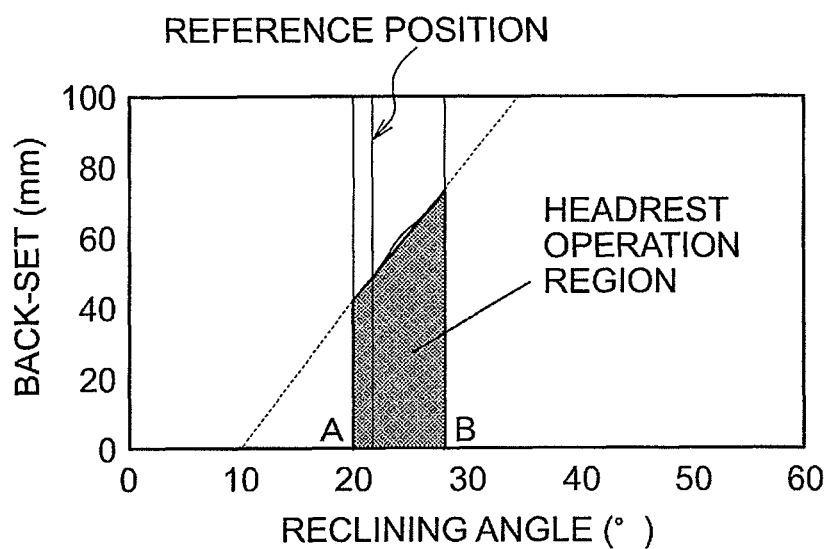
FIG. 14A and FIG. 14B are diagrams for explaining a headrest operation region.
Figure 14B:
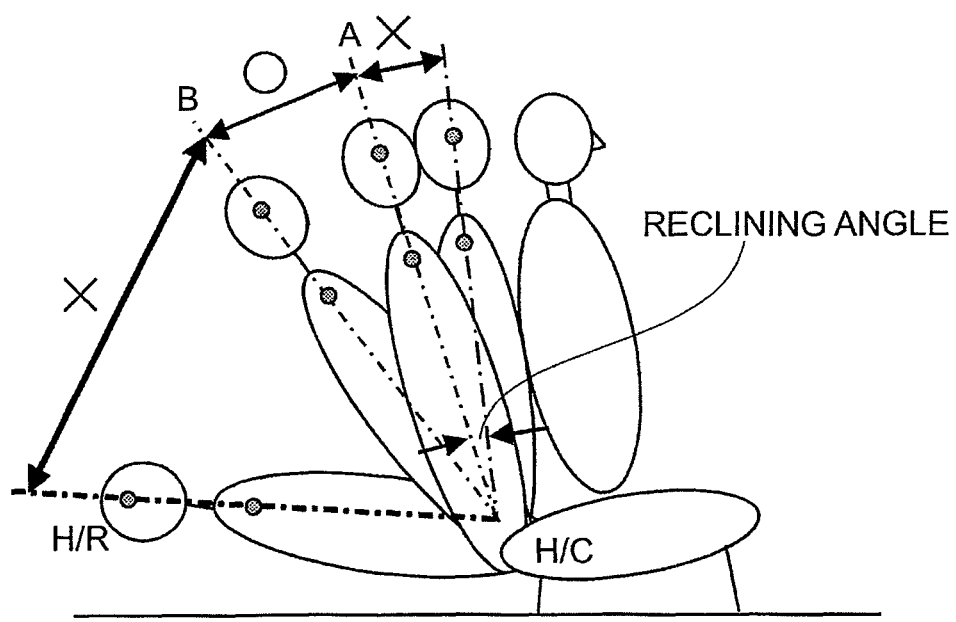

The ROM stores the back-set set value and the pressure—back-set table, and also stores set pressure values and a reference position that are references at the time of adjusting the reclining angle of the seat back 14. As shown in FIG. 14A, the greater the reclining angle, the greater the back-set. From this relationship, reclining angles that correspond to a range of appropriate back-sets are prescribed. Here, the range of reclining angles A through B is prescribed as a range that corresponds to a range of appropriate back-sets. This range A through B is called the headrest operation region. As shown in FIG. 14B, when the reclining angle is smaller than A, the current back-set is smaller than the appropriate back-set, and the position of the headrest cannot be adjusted any more than that, and therefore, this is outside of the headrest operation region. Further, when the reclining angle is greater than B, it is assumed that there is a situation in which there is no need to adjust the position of the headrest such as the passenger is horizontal and resting or the like, and therefore, this is outside of the headrest operation region. Moreover, the range of pressure values corresponding to the back-sets within this headrest operation region are set pressure values. A predetermined angle within the headrest operation region is prescribed as the reference position of the seat back 14.

Figure 15:
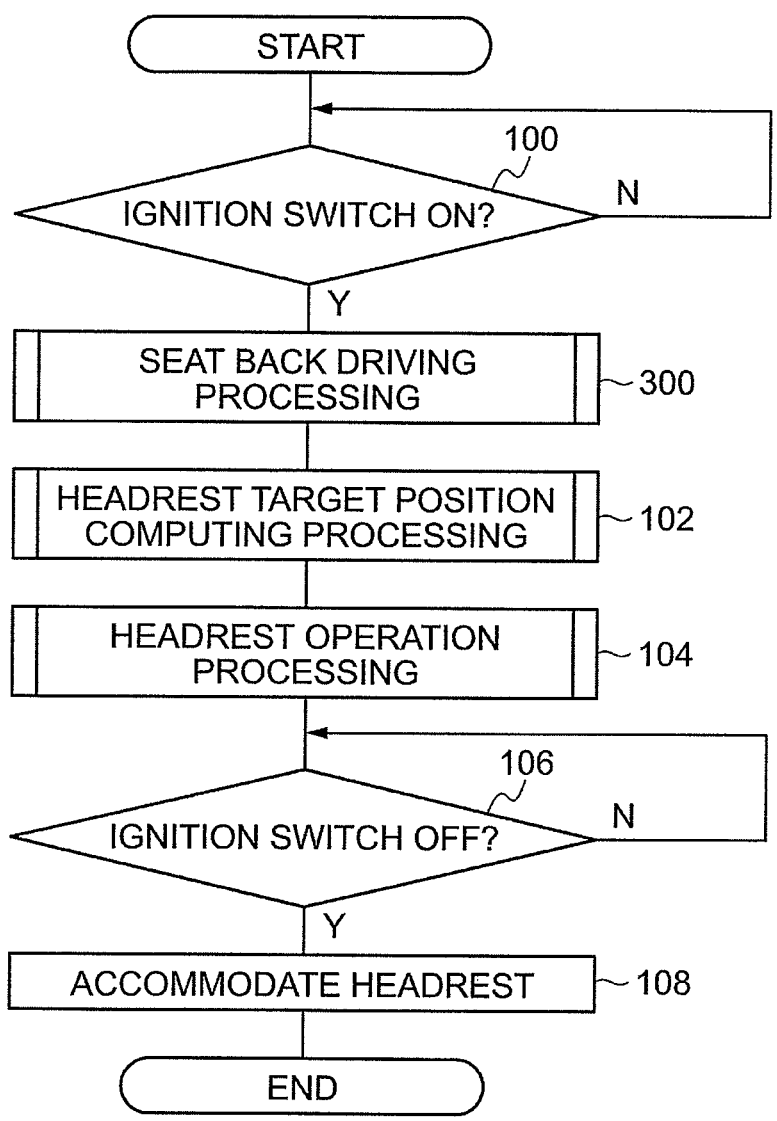
FIG. 15 is a flowchart showing the contents of a headrest position control processing routine in the third exemplary embodiment.

The processing routine of a headrest position control processing that is executed at the headrest device 310 of the third exemplary embodiment is described next with reference to FIG. 15. The present routine starts due to the CPU of the headrest controlling ECU 20 executing the program of the headrest position control processing routine, that is read-out from the ROM, when electric power is supplied to the headrest controlling ECU 20 from an unillustrated power source. Note that, here, a case is described in which the position of the headrest front portion 12b at the time of the start of the present routine (the initial position) is the fully closed position 11A. Further, processings that are the same as those of the headrest position control processing in the first exemplary embodiment are denoted by the same reference numerals, and detailed description thereof is omitted.

When it is judged in step 100 that the ignition switch 5 is on, the routine moves on to step 300 where seat back driving processing that is described hereafter is executed.

Next, the headrest target position computing processing (FIG. 7) is executed, and the target position of the headrest is computed. Next, in step 104, the headrest operation processing (FIG. 9) is executed, and the headrest is moved to the target position.

Next, when it is judged in step 106 that the ignition switch 5 is off, the routine moves on to step 108 where the headrest front portion 12b is accommodated at the initial position, and processing ends.

Figure 16:
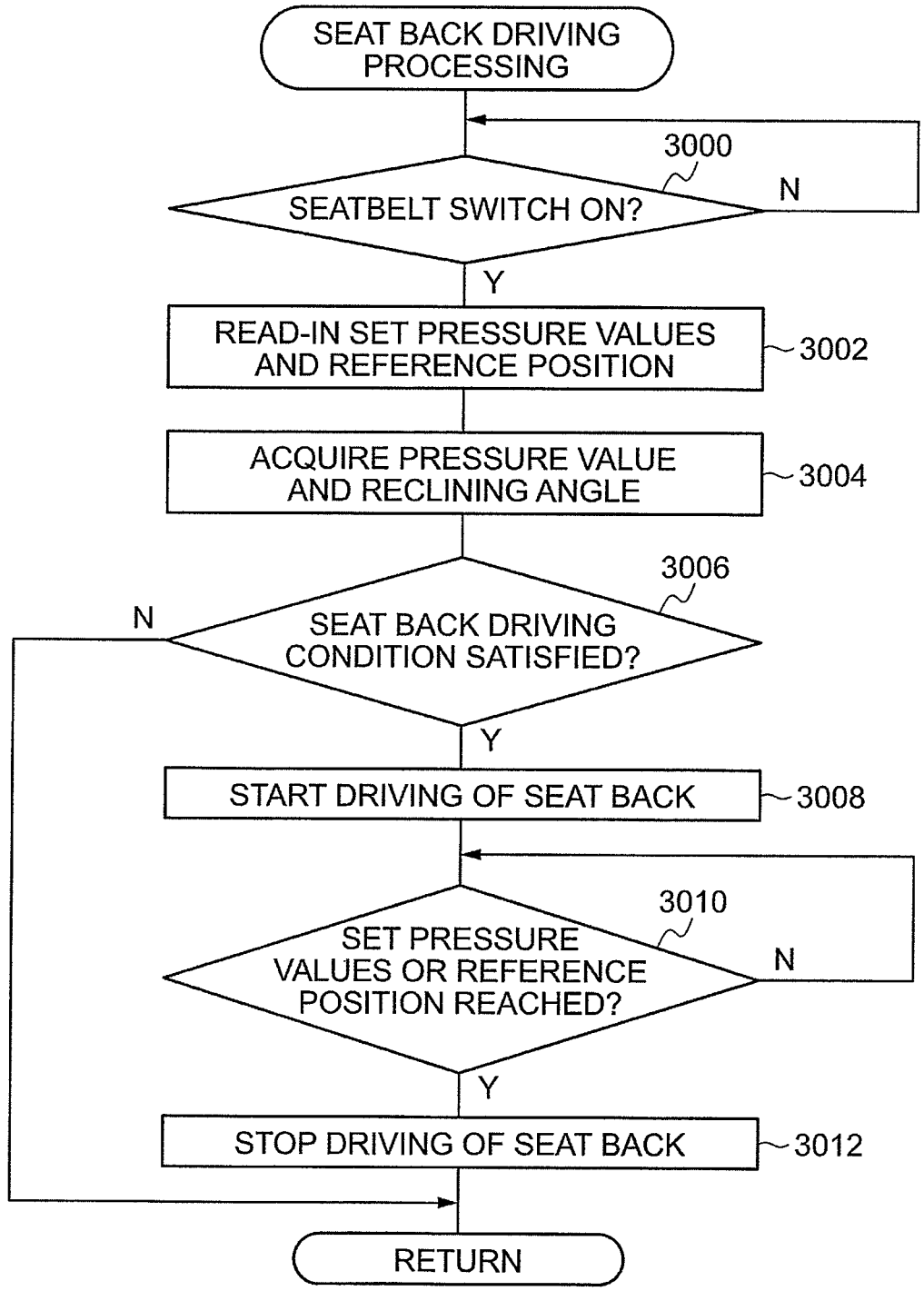
FIG. 16 is a flowchart showing the contents of a seat back driving processing routine in the third exemplary embodiment.

The processing routine of the seat back driving processing, that is executed in step 300 of the headrest position control processing (FIG. 15) in the third exemplary embodiment, is described next with reference to FIG. 16.

In step 3000, the operation signal of the seatbelt fastening confirmation switch 6 is taken-in, and, by judging whether or not the seatbelt fastening confirmation switch 6 is on, it is judged whether or not the passenger is seated in the seat and has fastened his/her seatbelt. When the seatbelt fastening confirmation switch 6 is on, the routine moves on to step 3002. Note that, in consideration of the time until the posture of the passenger becomes stable after fastening the seatbelt, the routine may move on to the next step after a predetermined time elapses from the seatbelt fastening confirmation switch 6 turning on. On the other hand, if the seatbelt fastening confirmation switch 6 is off, the judgment of the present step is repeated until it is judged that the seatbelt fastening confirmation switch 6 is on.

In step 3002, the set pressure values and the reference position that are stored in the ROM are read-in. In next step 3004, the detection signal detected at the pressure sensor 16, and the detection signal detected at the seat back angle sensor, are taken-in, and the pressure value and the reclining angle are acquired.

Next, in step 3006, it is judged whether or not a seat back driving condition is satisfied. Here, the seat back driving condition being satisfied means a case in which the pressure value acquired in step 3004 is outside of the range of set pressure values, or a case in which the reclining angle is not the reference position. If the pressure value is within the range of set pressure values or the reclining angle is the reference position, there is no need to adjust the reclining angle of the seat back 14, and therefore, the seat back driving condition is not satisfied. When the seat back driving condition is satisfied, the routine moves on to step 3008. When the seat back driving condition is not satisfied, the routine returns to the headrest position control processing routine without carrying out driving control of the seat back.

In step 3008, the motor is controlled and driving of the seat back 14 is started. When the reclining angle acquired in step 3004 is, for example, smaller than A shown in FIG. 14, the seat back 14 is driven in the rearward-reclining direction. On the other hand, if the reclining angle is greater than B shown in FIG. 14, the seat back 14 is driven in the forward-standing direction.

Next, in step 3010, the detection signal detected at the pressure sensor 16, and the detection signal detected at the seat back angle sensor, are taken-in, and the pressure value and the reclining angle are acquired, and it is judged whether the pressure value has entered into the range of the set pressure values, or whether the reclining angle has become the reference position. When the judgment is affirmative, the routine moves on to step 3012. When the judgment is negative, the judgment of the present step is repeated until the judgment becomes affirmative.

In step 3012, the motor is controlled, and driving of the seat back 14 is stopped. Due thereto, the reclining angle of the seat back 14 becomes an angle within the headrest operation region. After the position of the seat back 14 is adjusted, the routine returns to the headrest position control processing routine.

Note that, with regard to step 1020 of the headrest target position computing processing (FIG. 7) that is executed in step 102 of the headrest position control processing (FIG. 15) of the third exemplary embodiment, if this step 1020 is arrived at through an affirmative judgment in step 3006 of the above-described seat back driving routine (FIG. 16), the pressure value and the reclining angle at the time when the judgment becomes affirmative in step 3010 of the seat back driving processing may be used as is. Further, if step 1020 is arrived at through a negative judgment in step 3006 of the seat back driving processing, the pressure value and the reclining angle acquired in step 3004 of the seat back driving processing may be used as is.

As described above, in accordance with the headrest device of the third exemplary embodiment, the current back-set is estimated by using the pressure value that is applied to the seat back at the time when the reclining angle of the seat back is adjusted appropriately, and the position of the headrest is adjusted such that the back-set becomes the back-set set value that is an appropriate value. Therefore, the position of the headrest can be adjusted to a more appropriate state, stably and in a short time and by an inexpensive structure.

Note that the third exemplary embodiment describes a case in which headrest target position computing processing (FIG. 7), that is similar to the headrest target position computing processing in the first exemplary embodiment, is executed. However, the headrest target position computing processing (FIG. 11) of the second exemplary embodiment may be executed.

Further, the third exemplary embodiment describes the case of an electric-power reclining mechanism, but can also be applied to manual reclining mechanisms. In this case, until the detected pressure value enters the range of set pressure values, or until the reclining angle becomes the reference position, the passenger may be notified by a message such as "Please tilt the seat slightly further forward." or "Please tilt the seat slightly further rearward." being displayed on a display device or being output by a voice from a speaker.

A fourth exemplary embodiment is described next. In the fourth exemplary embodiment, stability is improved further by the pressure that is applied to the seat back 14 being detected plural times. Note that, because structures of the headrest device of the fourth exemplary embodiment are the same as those of the headrest device 10 of the first exemplary embodiment, description thereof is omitted.

Figure 17:
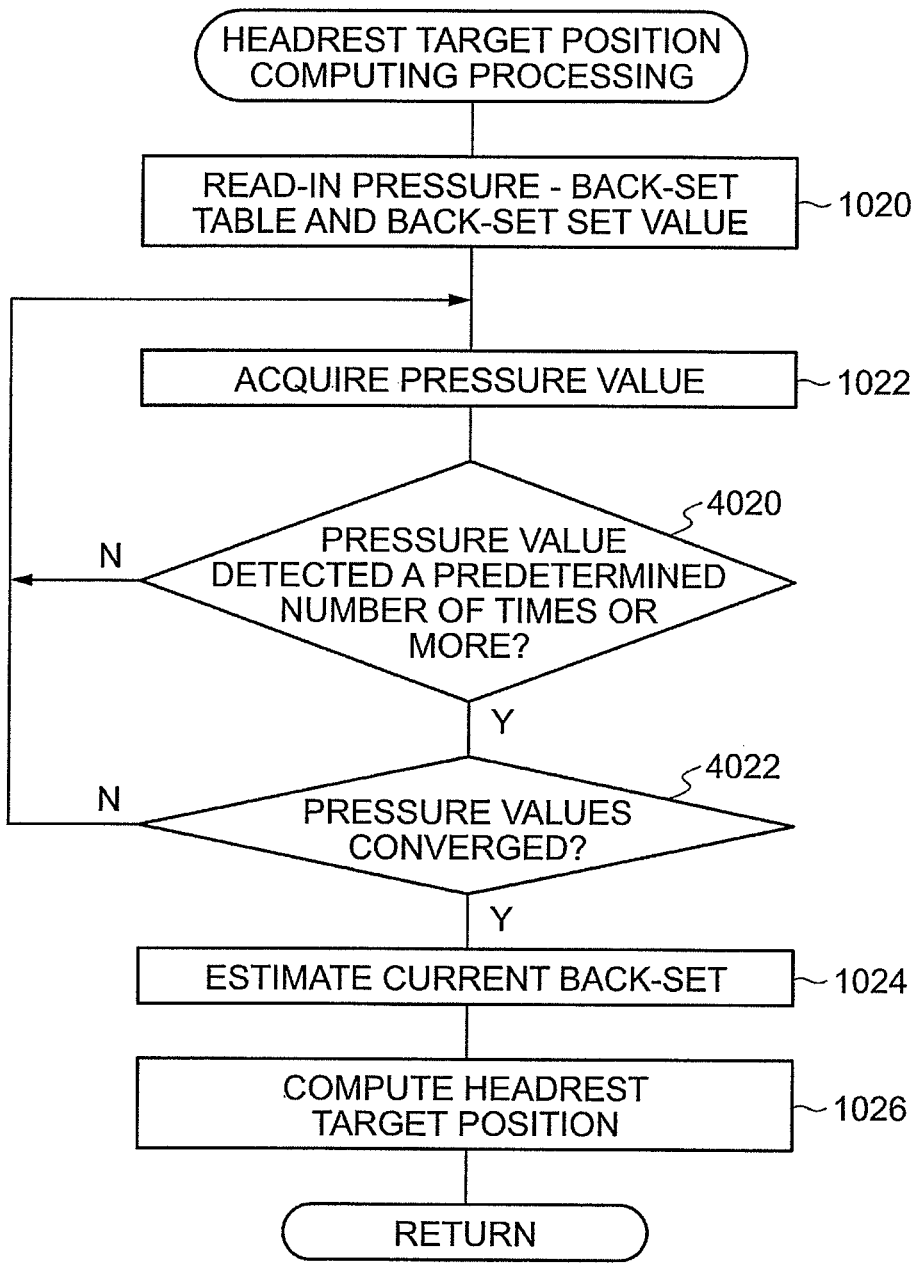
FIG. 17 is a flowchart showing the contents of a headrest target position computing processing routine in a fourth exemplary embodiment.

Here, headrest position control processing in the fourth exemplary embodiment is described. In the headrest position control processing in the fourth exemplary embodiment, only the headrest target position computing processing, that is executed in step 102 of the headrest position control processing (FIG. 6) of the first exemplary embodiment, differs. Therefore, here, the headrest target position computing processing routine of the fourth exemplary embodiment is described with reference to FIG. 17. Note that processings that are the same as those of the headrest target position computing processing of the first exemplary embodiment are denoted by the same reference numerals, and detailed description thereof is omitted.

In step 1020, the pressure—back-set table and the back-set set value that are stored in the ROM are read-in. Next, in step 1022, the pressure value is acquired.

Next, in step 4020, it is judged whether or not the pressure applied to the seat back has been detected a predetermined number of times or more. The predetermined number of times can be set to, for example, three times or the like. When the pressure has been detected the predetermined number of times or more, the routine moves on to step 4022. If the pressure has not been detected the predetermined number of times or more, the detected pressure values are once stored in the RAM, and the routine returns to step 1022.

In step 4022, it is judged whether or not the pressure values that have been detected the predetermined number of times have converged. The judgment as to whether the pressure values have converted can be carried out by, for example, judging whether or not the dispersion in the pressure values of the predetermined number of times has become less than or equal to a predetermined threshold value. If the pressure values have not converged, the routine returns to step 1022.

Then, when it is judged, in the judgments of step 4020 and 4022, that the pressure values that have been detected the predetermined number of times or more have converged, processings from step 1024 on are executed.

As described above, in accordance with the headrest device of the fourth exemplary embodiment, pressure values that are applied to the seat back are detected a plural number of times, and, after the pressure values converge, the position of the headrest is adjusted. Therefore, the detected pressure value becoming an inappropriate value due to a momentary movement of the head portion or the like, and the estimation of the current back-set becoming unreliable, and the headrest being adjusted to an inappropriate position on the basis thereof, can be prevented, and the position of the headrest can be adjusted more stably.

Note that, although the fourth exemplary embodiment describes a case in which the pressure value is detected plural times in the first exemplary embodiment, the fourth exemplary embodiment can be applied in the same way to the second and third exemplary embodiments as well.

Further, instead of detecting the pressure value plural times, the pressure value may be detected again after a predetermined time elapses from the initial detection of the pressure value, and the position of the headrest may be controlled when the difference between the pressure value that was initially detected and the pressure value that was detected again becomes within a predetermined value. In this case as well, effects that are similar to those of the fourth exemplary embodiment are obtained.

A headrest device of a fifth exemplary embodiment is described next. In the fifth exemplary embodiment, the position of the headrest is adjusted again not only when the passenger sits in the seat, but also when the back-set changes. Note that, because the structure of the headrest device of the fifth exemplary embodiment is the same as that of the headrest device 10 of the first exemplary embodiment, description thereof is omitted.

Figure 18:
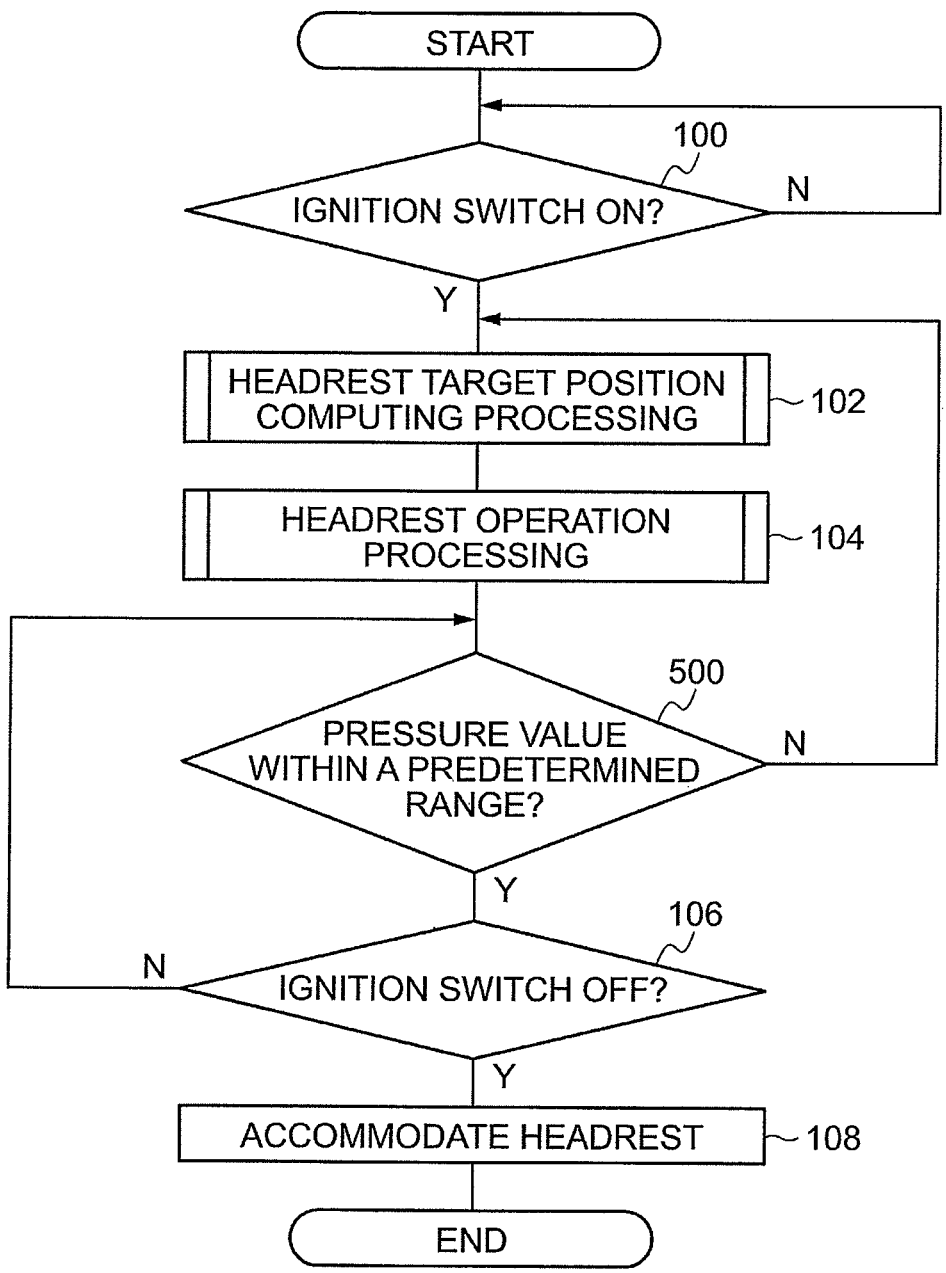
FIG. 18 is a flowchart showing the contents of a headrest position control processing routine in a fifth exemplary embodiment.

Here, headrest position control processing in the fifth exemplary embodiment is described with reference to FIG. 18. Note that processings that are the same as those of the headrest position control processing of the first exemplary embodiment are denoted by the same reference numerals, and detailed description thereof is omitted.

After the position of the headrest is adjusted once through steps 100 through 104, in step 500, the pressure value is acquired at a predetermined time interval and always monitored. Then, it is judged whether or not the pressure value is within a predetermined range. The predetermined range can be made to be, for example, the range of the set pressure values that was described in the third exemplary embodiment. When the pressure value is within the predetermined range, the routine moves on to step 106. When the pressure value is outside of the predetermined range, the routine returns to step 102, and the position of the headrest is adjusted again.

When it is judged in step 106 that the ignition switch 5 is not off, the routine returns to step 500, and monitoring of the pressure value is continued.

As described above, in accordance with the headrest device of the fifth exemplary embodiment, by monitoring the pressure value that is applied to the seat back, the position of the headrest is adjusted appropriately also when the back-set changes. Further, when the pressure value has moved outside of the predetermined range, the position of the headrest is adjusted again. Therefore, the annoyance of the position of the headrest being adjusted frequently due to slightly changes in the back-set can be avoided.

Note that, although the fifth exemplary embodiment describes a case in which the pressure value is always monitored in the first exemplary embodiment, the fifth exemplary embodiment can similarly be applied to the second through fourth exemplary embodiments as well.

Figure 19:
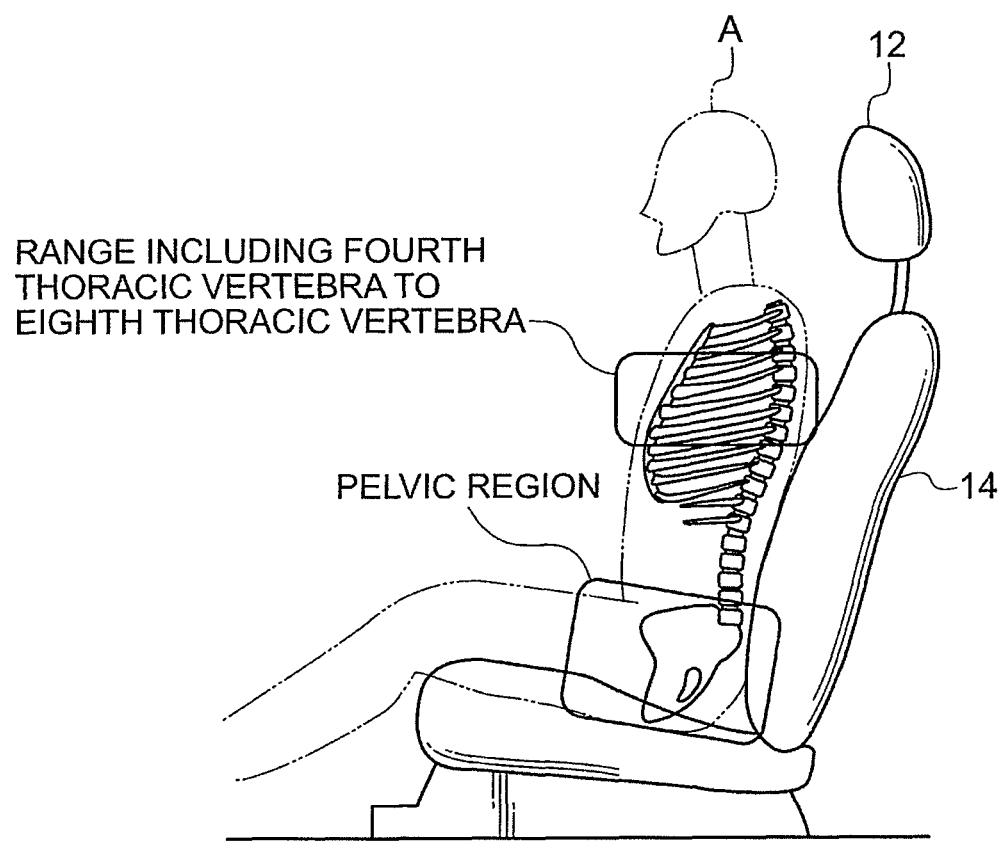
FIG. 19 is a diagram for explaining suitable placement of a pressure sensor.

Further, the respective exemplary embodiments describe cases in which the pressure that is applied to the seat back is detected by using a pressure sensor sheet that is disposed over the entire surface of the vehicle front side of the seat back. However, there may be a structure in which pressure sensors are disposed at plural places at the vehicle front side of the seat back. Note that the position at which the pressure sensor is placed can be made to be a position that is at a height in the vicinity of the back portion of the passenger, and that is at the center of or at the left and right of the seat back. In particular, as shown in FIG. 19, it is preferable for the position to be a position that includes at least one of the range of the fourth thoracic vertebra through the eighth thoracic vertebra of the passenger, or a position that corresponds to the pelvic region. At this position, fluctuations in the pressure that is applied to the seat back with respect to changes in the posture of the passenger are small, and therefore, the pressure value can be detected stably.

Moreover, the exemplary embodiments describe cases in which the pressure that is applied to the seat back is detected. However, the flexure of the seat back at the time when the passenger leans against the seat back may be detected. A potentiometer that detects the displacement amount of a spring provided at the seat frame within the seat back, or a load cell that measures the strain by using a tension structure, or the like can be used as the portion that detects the flexure. Or, both pressure and flexure may be used in combination.

Although the respective exemplary embodiments describe cases using a pressure—back-set table such as shown in FIG. 5, the relationship between pressure values and back-sets that is prescribed by a correspondence table or a computational formula or the like may be used.

Further, in the exemplary embodiments, 35 mm is described as an example of the magnitude of the appropriate back-set (the back-set set value), but the magnitude of the appropriate back-set is not limited to this. Various values such as, for example, 32 mm, 37 mm, or the like can be considered.

Moreover, the respective exemplary embodiments describe cases in which processing that controls the position of the headrest is carried out when the ignition switch is on, but the present invention is not limited to this. Judgment may be carried out in accordance with the detection signal of a seating sensor, or judgment may be carried out in accordance with whether or not the vehicle speed has become greater than or equal to a predetermined speed.

Further, the exemplary embodiments describe cases in which the headrest front portion is moved in a structure in which the headrest main body has the headrest front portion and the headrest rear portion. However, the structure of the headrest disclosed in JP-A No. 2008-94385 for example may be employed, and the headrest main body may be moved in the forward and backward directions as shown schematically in FIG. 8.

What is claimed is:

1. A headrest device comprising:
 a headrest main body that is provided so as to be moveable in a vehicle longitudinal direction, at an upper end portion of a seat back of a seat in which a passenger sits;
 a pressure/flexure detecting section that is provided at a vehicle front side of the seat back, and that detects at least one of pressure that is applied to the seat back from a back portion of a passenger seated in the seat, or flexure of the seat back;
 a headrest moving section that moves in the headrest main body in the vehicle longitudinal direction; and
 a control section that estimates a current back-set which is a distance between a head portion of a passenger and the headrest main body in a horizontal direction, the estimated current back-set corresponding to at least one of pressure or flexure detected by the pressure/flexure detecting section on the basis of a stored relationship between back-set-value and the at least one of pressure or flexure, and controls the headrest moving section to move the headrest main body such that the back-set becomes a predetermined amount.

2. The headrest device of claim 1, further comprising an angle detecting section that detects a reclining angle of the seat back,
 wherein the control section estimates the current back-set on the basis of at least one of pressure and flexure detected by the pressure/flexure detecting section, and the reclining angle detected by the angle detecting section, and a predetermined relationship between the back-set and the reclining angle and the at least one of pressure and flexure.

3. The headrest device of claim 1, further comprising:
 an angle detecting section that detects a reclining angle of the seat back; and
 a seat back moving section that moves the seat back so as to change the reclining angle of the seat back,
 wherein the control section controls movement of the headrest main body such that the back-set becomes a predetermined amount, after the control section controls the seat back moving section to move the seat back until the at least one of pressure and flexure detected by the pressure/flexure detecting section becomes a predetermined value or until the reclining angle becomes a predetermined angle prescribed in advance.

4. The headrest device of claim 1, wherein the pressure/flexure detecting section is a pressure sensor, a load cell, or a potentiometer.

5. The headrest device of claim 1, wherein the pressure/detecting section is disposed at a position corresponding to at least one of a pelvic region and a range of a fourth thoracic vertebra through eighth thoracic vertebra of a passenger seated in the seat.

6. The headrest device of claim 1, wherein the control section controls the headrest moving section to move the headrest main body such that the back-set becomes a predetermined amount, after pressures that have been detected a plurality of times by the pressure/flexure detecting section converge, or after flexures that have been detected a plurality of times by the pressure/flexure detecting section converge.

7. The headrest device of claim 1, wherein the control section controls the headrest moving section to move the headrest main body such that the back-set becomes a predetermined amount, when a difference between a pressure detected by the pressure/flexure detecting section and a pressure detected again after a predetermined time is less than or equal to a predetermined value, or when a difference between a flexure detected by the pressure/flexure detecting section and a flexure detected again after a predetermined time is less than or equal to a predetermined value.

8. The headrest device of claim 1, wherein, when at least one of the pressure and flexure detected by the detecting section exceeds a predetermined range, the control section controls the headrest moving section to move the headrest main body such that the back-set becomes a predetermined amount again.

9. The headrest device of claim 1, wherein the headrest main body has a headrest rear section that is supported at the upper end portion of the seat back, and a headrest front portion that is provided so as to be able to approach and move away from the headrest rear portion and is moveable in the vehicle longitudinal direction between a fully closed position, at which the headrest front portion is nearest to the headrest rear portion, and a fully open position, at which the headrest front portion is furthest away from the headrest rear portion, and the headrest moving section moves the headrest main body in the vehicle longitudinal direction by moving the headrest front portion between the fully open position and the fully closed position.

10. A method of adjusting headrest position comprising:
by a pressure/flexure detecting section that is provided at a vehicle front side of a seat back of a seat in which a passenger sits, detecting at least one of pressure applied to the seat back from a back portion of a passenger seated in the seat, or flexure of the seat back;
estimating a current back-set which is a distance between a head portion of a passenger and the headrest main body in a horizontal direction, the estimated current back-set corresponding to at least one of pressure or flexure detected by the pressure/flexure detecting section on the basis of a stored relationship between back-set value and the at least one of pressure or flexure; and
by a moving section, moving the headrest main body, that is provided at an upper end portion of the seat back so as to be moveable in a vehicle longitudinal direction, such that the back-set becomes a predetermined amount.

11. A vehicle seat comprising the headrest device of claim 1.

* * * * *